May 16, 1944.  F. R. COWELL  2,348,960
INTERNALLY EXPANDING BRAKE
Filed Aug. 20, 1942  3 Sheets-Sheet 2

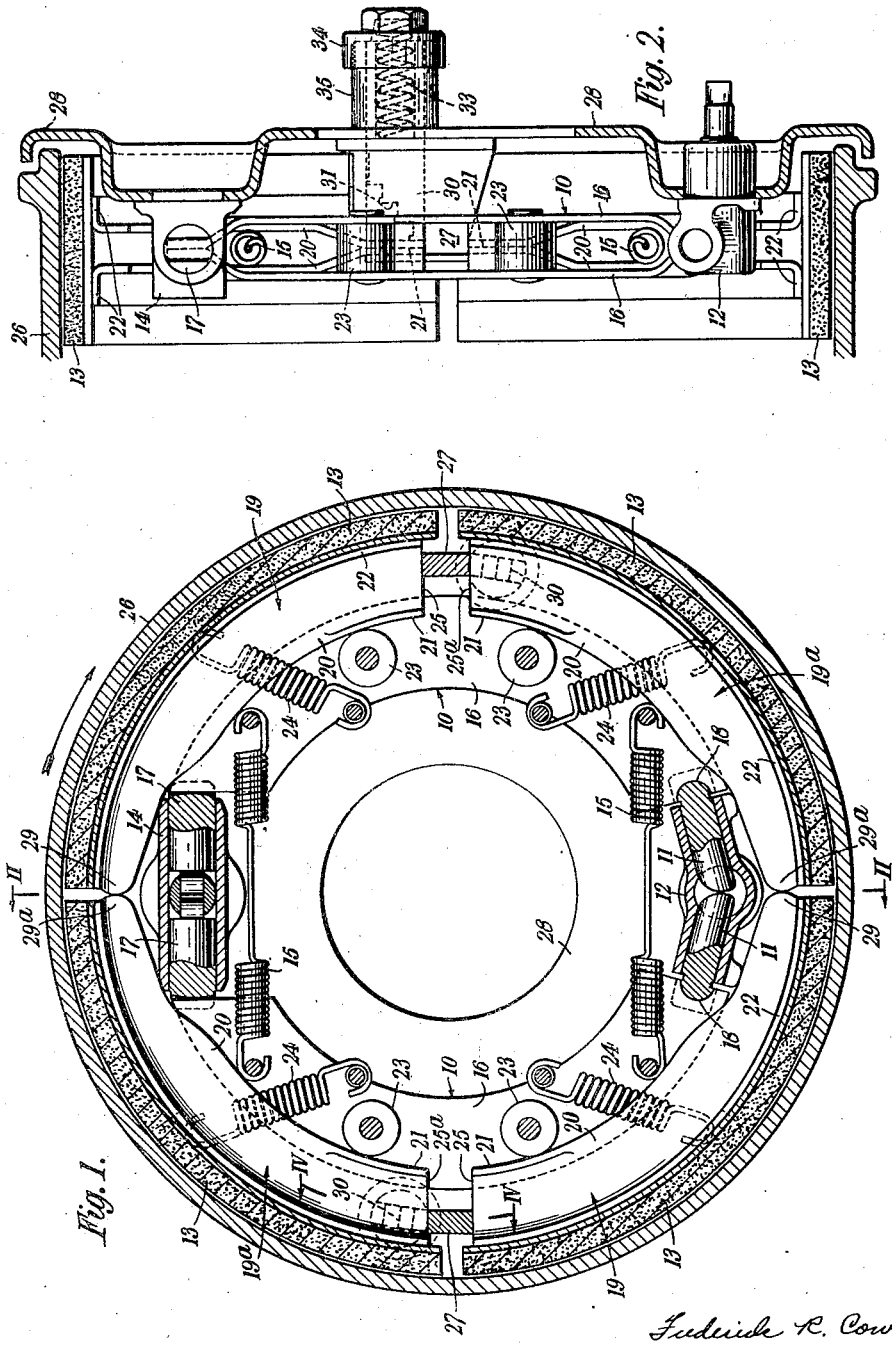

Frederick R. Cowell
By
Watson, Cole, Grindle &
Watson
Attys

Patented May 16, 1944

2,348,960

UNITED STATES PATENT OFFICE 2,348,960

INTERNALLY EXPANDING BRAKE

Frederick Raymond Cowell, Leeds, England, assignor to Kirkstall Forge Limited, Leeds, England Application August 20, 1942, Serial No. 455,488
In Great Britain September 4, 1941

5 Claims. (Cl. 188—78)

In U. S. Patent No. 2,271,815 I have described various forms of internally expanding brakes designed to provide an effective braking surface extending around substantially the whole of the periphery of the brake drum and to obtain a uniform distribution of braking pressure over the contacting surfaces of the brake shoes and the drum.

In all the constructions described in the above-mentioned earlier U. S. patent, the brake is of the type comprising a pair of brake-shoe-carriers which are normally held inoperative and which move outwardly to apply the brake, each carrier supporting a pair of brake shoes, both of which are arranged to present one end to the brake drum before the other on outward movement of the carrier and are free to move circumferentially with respect to the carrier to a limited extent when contacted by the revolving brake drum, and means operative on circumferential movement of the shoes as aforesaid to tilt the shoes in relation to the carrier so as to approach the remote ends of the shoes towards the drum, thereby equalising the braking pressure over the contacting faces of the shoes and the drum.

The present invention provides a simplified arrangement for achieving the same result, which is cheaper to produce.

The invention provides an internally expanding brake of the above type, which includes stop means operating, on contact of the shoes with the revolving brake drum, to arrest the trailing shoe on each carrier while maintaining its front end in braking contact with the drum, the front end of the leading shoe on each carrier being brought, by the frictional drag of the drum, into abutment with the rear end of the trailing shoe on the other carrier, thereby tilting all of the shoes to bring their abutting ends into closer engagement with the drum.

Preferably the stop means is constituted by a pair of stops, located respectively between the adjacent ends of the shoes on the two carriers, and lying in the path of the trailing shoes.

Two alternative forms of internally expanding brake according to the invention, for use in a motor vehicle, will now be described in further detail, by way of example, with reference to the accompanying drawings in which—

Fig. 1 is a vertical section through the brake drum of the first arrangement, showing the brake off and with new linings.

Figure 3:
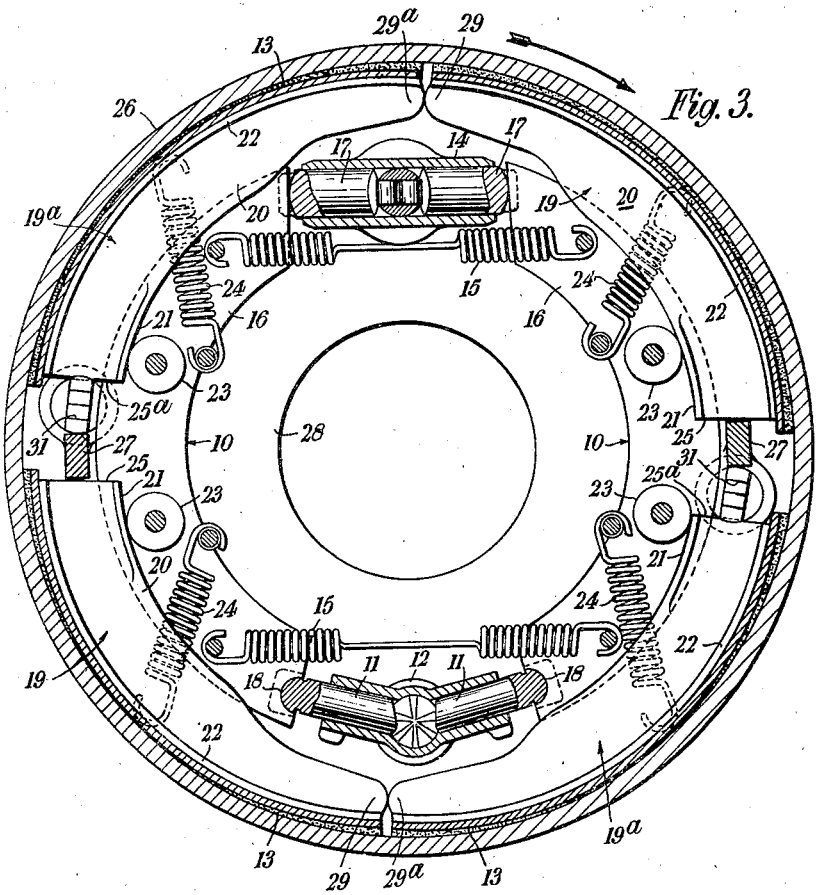
Figure 4:
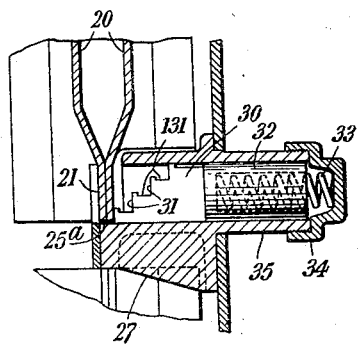
Figure 5:
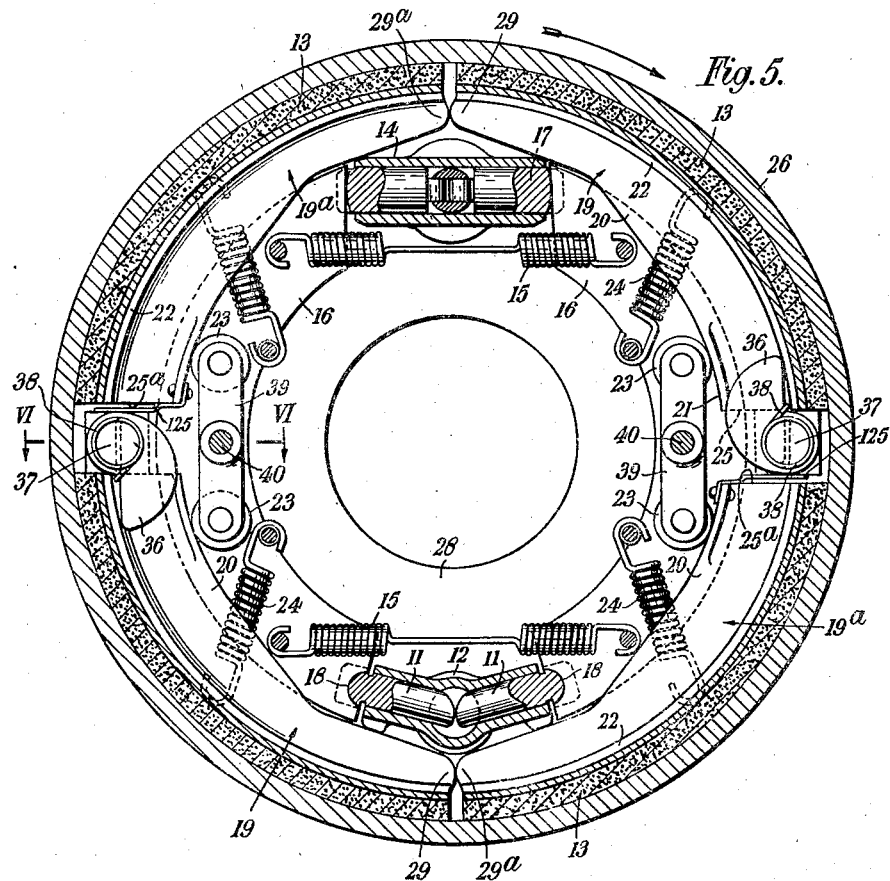
Figure 6:
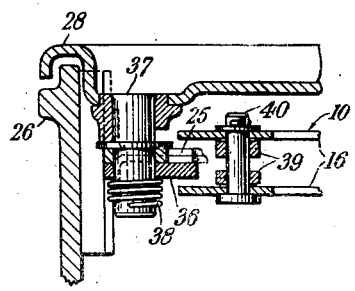

Fig. 2 is a section on the line II—II in Fig. 1, but showing the expander and brake adjuster in elevation, Fig. 3 is a sectional view similar to Fig. 1, but showing the brake on and the linings worn, Fig. 4 is a section on the line IV—IV in Fig. 1, Fig. 5 is a sectional view, similar to Fig. 1 but with the brake on, showing the second arrangement, and Fig. 6 is a section on the line VI—VI in Fig. 5.

Like reference numerals indicate like parts throughout the figures.

Referring first of all to the arrangement shown in Figs. 1–4, the two carriers 10, which are of approximately semicircular form, are pivoted at one end on anchor pins 11 carried by a brake adjuster 12 which is operable, in known manner, and as described in U. S. Patent No. 2,271,815, to space the anchor pins further apart for the purpose of counteracting wear on the brake linings 13. Between the free ends of the carriers is arranged an expander 14, which is operable, also as described in U. S. Patent No. 2,271,815, to force the carriers outwardly about their pivots to apply the brake against the action of springs 15 interconnecting the carriers.

As shown in Fig. 2, each carrier 10 consists of two spaced plates 16, which are pinched together at their opposite ends to coact with the anchor pins 11 of the brake adjuster and with the plunger 17 of the expander. Each anchor pin 11 has a cylindrical head, formed with an axially extending groove, the inner edge of which is defined by the arcuate line 18, the end of the carrier, which is correspondingly slotted, being fitted into this groove. The plungers 17 of the expander are slotted to receive the ends of the carriers.

Each brake shoe is formed of a pair of spaced plates 20, located inside the plates 16 of the carrier. The plates 20 are pinched together at their inner ends at 21, and are outwardly flanged at their outer ends 22 to facilitate in the attachment of the lining. The inner portions 21 of the shoes coact each with a roller 23 mounted on the carrier, so as to permit the shoes to move circumferentially in relation to the carrier against the action of springs 24 connecting the shoes to the carrier. The adjacent ends 25, 25$^a$ of the two shoes of each pair are located at about 90° from the expander 14, and it is these two ends which first make contact with the brake drum 26 on application of the brake. The rollers 23 are located in the neighbourhood of the adjacent ends of the shoes.

Between the adjacent ends 25, 25$^a$ of the two shoes of each pair is located a fixed stop 27 attached to the back plate or anchor bracket 28 on the axle. This back plate carries the expander 14 and brake adjuster 12 as shown in Fig. 2.

When the brake shoes are contacted by the rotating brake drum 26 (which is assumed to be rotating in the direction of the arrow), they tend to move circumferentially in relation to the carriers, this movement causing the front end 25 of each trailing shoe 19 to abut against the fixed stop, and the front end 29a of each leading shoe 19a to abut against the rear end 29 of the trailing shoe 19 on the other carrier. The result of the abutment of the two upper shoes shown in Fig. 1 is that a force, directed towards the right, is exerted on the end 29 of the shoe 19, so rocking the shoe clockwise on its supporting roller 23 and bringing its end 29 into closer engagement with the brake drum. There also is a reaction directed towards the left, on the end 29a of the shoe 19a which rocks the shoe 19a anticlockwise about its supporting roller 23 and thus brings its end 29a into closer engagement with the brake drum. A similar action takes place with the two lower shoes. As already explained the inner ends 21 of all the shoes first make contact with the drum on application of the brake, and the subsequent movement of the other ends 29, 29a of the shoes into closer contact with the drum when the shoes are arrested by the stops, has the effect of equalizing the braking pressure between the shoes and the drum. It will be appreciated that this action will take place for both directions of rotation of the drum, so that when the brake is fitted to a road vehicle it will be equally effective whether the vehicle is travelling forwards or in reverse.

As the linings become worn, the clearances between the abutting end 29, 29a of the shoes and between the shoes and the fixed stops 27 increase, so that when the linings are nearly worn out, there is likely to be a considerable shock when the brake is applied.

To avoid this disadvantage an automatic slack adjuster is provided. This consists of a pair of wedges 30 each of which is mounted adjacent to one of the fixed stops 27. Each wedge has a stepped end, the steps being indicated by the reference 31, and constitutes a forward prolongation of a plunger 32 (see Fig. 4) which is slidably mounted in a cylinder 35 formed as a unit with and extending rearwardly from the associated fixed stop 27. A spring 33, located in a recess in the plunger 32 and abutting against a screw cap 34 which closes the cylinder 35, tends to urge the wedge 30 in a forward direction.

When the linings are new, the end step 31 of the wedge 30 rests beneath the brake shoe adjoining the stop as shown in Fig. 4. As wear takes place, the wedge is forced forwards by the spring 33 until the end step can move into position between the fixed stop 27 and the end 25a of the adjoining shoe, so increasing the effective width of the fixed stop and taking up slack. After more wear has taken place, the next step comes into operation and so on, until the linings are completely worn, when the last step has come into operation and the whole width of the plunger is utilized to take up the slack between the shoe and the fixed stop, as shown in Fig. 3. The riser portion of each step 31, which is of greater depth than the thickness of the flattened portion 21 of the shoe, is cut away, as indicated at 131, and as the wedge moves forward to introduce a new step between the stop 27 and the shoe, the end 25a of the shoe will consequently slip into the recess 131. The wedge will move forward to take up the slack while the brake is on, and the small clearance between the wedge and the shoe then provided by the recess 131, will be sufficient to permit of the shoes being moved to the off position by the springs 15.

In the alternative construction shown in Figs. 5 and 6, the arrangement is generally the same except that the stops 27 are constituted by snail cams 36 which are rotatably mounted on pins 37 fixed to the back plate 26. A helical spring 38, one end of which is tucked rearwardly into a hole in the pin 37 and the other end of which engages under the nose of the snail cam 36, tends to turn the latter in the sense indicated by the arrows, so as to bring a wider portion of the cam into the space between the ends 25, 25a of the shoes, in this way automatically taking up the slack as the linings wear.

On the rear end 25a of each trailing shoe 19a is mounted a leaf spring 125, which, being more powerful than the helical spring 38, lies parallel to the end of the shoe (as shown in Fig. 5) despite the tendency of the snail cam 36 to press it back against the shoe. When the brake is released, however, the springs 15 will overpower the leaf springs 125, and the clearance occasioned by their deflection into contact with the ends of the shoes will be sufficient to permit the shoes to move into the off position.

In the arrangement shown in Fig. 5 the two rollers 23 on each carrier, which serve to support the adjacent ends of the two shoes, are mounted on opposite ends of a link 39 which can float relatively to the carrier on a central pivot 40. With this arrangement an equal outward thrust will be applied to the adjacent ends 25, 25a of each pair of shoes 19, 19a when the carriers are moved outwards, thereby further equalizing the braking pressure between the shoes and the drum.

It will be understood that the carriers need not necessarily be mounted on pivots as illustrated, but that the brake adjuster may be replaced by a second expander, the two expanders acting to force the carriers bodily apart to apply the brakes as described in U. S. Patent No. 2,271,815.

With the above-described arrangements not only is it possible to utilize nearly the whole periphery of the drum for braking and to equalise the braking pressure between the shoes and the drum, but a self-energizing effect is obtained, the reaction of the effort which forces the remote ends 29, 29a of the shoes against the drum being taken on the fixed stops and not resisting the driver's effort in applying the brakes.

I am aware that a brake has been proposed having two shoes on each carrier, each shoe being mounted centrally on a roller, on which it can pivot to equalize the braking pressure over the surface of the shoe. In this construction the adjacent ends of the two shoes on each carrier were arranged to abut against one another and fixed stops, located in the vicinity of the pivots and of the expander, were provided for the purpose of arresting the shoes. My invention is distinguished from this arrangement in two important respects. In the first place I arrange for the stop means to arrest the trailing shoes on the two carriers, and not the leading shoes as do the stops of this prior proposal, and arrange for the leading shoe on each carrier to abut against the trailing shoe on the other carrier instead of making the two shoes on the same carrier abut against one another. In the second place, I arrange for the initial braking pressure, due to the outward movement of the carriers to be applied to one end of each shoe and the self-energizing pressure due to the stop means to be applied to the other ends of the shoes; instead of applying the initial braking pressure centrally of the shoes as in the known arrangement.

Although the invention has been described mainly with reference to its application to brakes for motor road vehicles, it is to be understood that it may equally well be used in internally expanding brakes for other purposes.

What I claim as my invention and desire to secure by Letters Patent is:

1. An internally expanding brake, comprising a brake drum, a pair of brake-shoe-carriers mounted within the drum, means for retaining the carriers in an inoperative position, an expander for moving the carriers outwardly to apply the brake, a pair of brake shoes mounted on each carrier, a pair of rollers on each carrier supporting the adjacent ends of the two shoes and permitting of circumferential movement of the shoes in relation to the carrier, a floating link on each carrier carrying the rollers at its ends and pivoted centrally to the carrier, all of the brake shoes being arranged to present one end to the brake drum before the other on outward movement of the carriers and stop means operating, on circumferential movement of the shoes when contacted by the revolving brake drum, to arrest the trailing shoe on each carrier while maintaining its front end in braking contact with the drum, and thereby causing all of the shoes to tilt, on the subsequent abutment of the front end of the leading shoe on each carrier with the rear end of the trailing shoe on the other carrier, to bring their said abutting ends into closer engagement with the brake drum.

2. In an internally expanding brake, in combination, a brake drum, two brake shoe carriers mounted within the drum, means normally maintaining the carriers in inoperative position, an expander for moving the carriers outwardly to apply the brake, a leading brake shoe and a trailing brake shoe mounted on each carrier, the brake shoes being so arranged on the carriers that the front end of the leading shoe of one carrier may engage the rear end of the trailing shoe of the other carrier when said shoes are in engagement with the drum, means on each carrier for causing the adjacent ends of the two brake shoes mounted on that carrier to contact with the drum before the opposite ends of said shoes contact with said drum when the carriers are moved outwardly, and stop means to arrest the movement of the trailing shoe of each carrier upon engagement of the shoes with the drum, thereby causing the front end of the leading shoe of each carrier to abut against the rear end of the trailing shoe of the other carrier and these abutting ends to be brought into closer engagement with the drum when the movement of said trailing shoes is arrested by said stop means.

3. In an internally expanding brake, in combination, a brake drum, two brake shoe carriers mounted within the drum, means normally maintaining the carriers in inoperative position, an expander for moving the carriers outwardly to apply the brake, a leading brake shoe and a trailing brake shoe mounted on each carrier, the brake shoes being so arranged on the carriers that the front end of the leading shoe of one carrier may engage the rear end of the trailing shoe of the other carrier when said shoes are in engagement with the drum, a pair of rollers on each carrier for supporting the adjacent ends of the two brake shoes mounted on that carrier for limited circumferential movement relative thereto and to cause said ends to contact with the drum before the opposite ends of said shoes contact with said drum when the carriers are moved outwardly, and stop means to arrest the movement of the trailing shoe of each carrier upon engagement of the shoes with the drum, thereby causing the front end of the leading shoe of each carrier to abut against the rear end of the trailing shoe of the other carrier and these abutting ends to be brought into closer engagement with the drum when the movement of said trailing shoes is arrested by said stop means.

4. In an internally expanding brake, in combination, a brake drum, two brake shoe carriers mounted within the drum, means normally maintaining the carriers in inoperative position, an expander for moving the carriers outwardly to apply the brake, a leading brake shoe and a trailing brake shoe mounted on each carrier, the brake shoes being so arranged on the carriers that the front end of the leading shoe of one carrier may engage the rear end of the trailing shoe of the other carrier when said shoes are in engagement with the drum, a floating link pivotally mounted centrally on each carrier, rollers mounted on the ends of each link and engaging, respectively, the adjacent ends of the brake shoes mounted on that carrier, said rollers causing the adjacent ends of the two brake shoes mounted on that carrier to contact with the drum before the opposite ends of said shoes contact with said drum when the carriers are moved outwardly, and stop means to arrest the movement of the trailing shoe of each carrier upon engagement of the shoes with the drum, thereby causing the front end of the leading shoe of each carrier to abut against the rear end of the trailing shoe of the other carrier and these abutting ends to be brought into closer engagement with the drum when the movement of said trailing shoes is arrested by said stop means.

5. The combination set forth in claim 3 in which a spring connects each shoe to the associated carrier and opposes circumferential movement of such shoe relatively to the carrier.

FREDERICK RAYMOND COWELL.